S. S. KNIGHT.
METHOD OF MAKING CAR WHEELS, &c.
APPLICATION FILED JAN. 30, 1911.
1,005,230.
Patented Oct. 10, 1911.
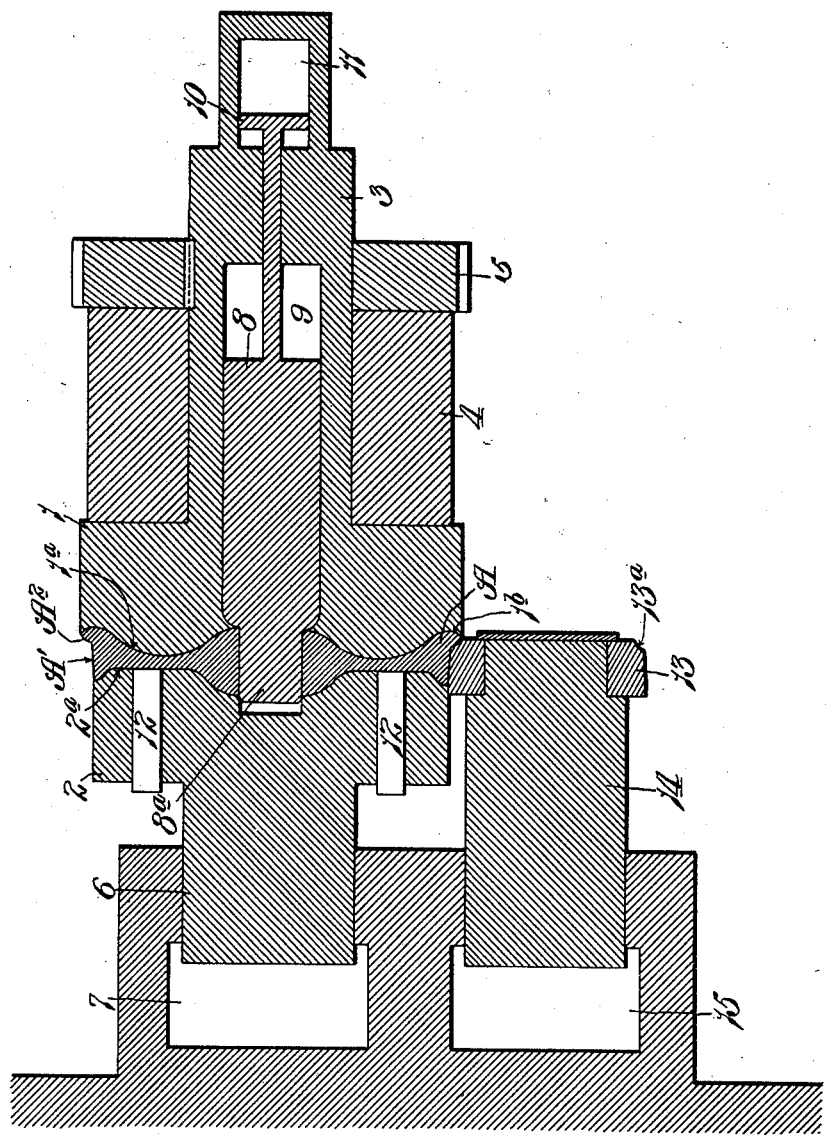
Witnesses:
Inventor:
Sherwood S. Knight.
By Paul Bakewell Atty.

UNITED STATES PATENT OFFICE.

SHERWOOD S. KNIGHT, OF WEBSTER GROVES, MISSOURI, ASSIGNOR TO SCULLIN-GALLAGHER IRON & STEEL COMPANY, OF ST. LOUIS, MISSOURI, A CORPORATION OF MISSOURI.

METHOD OF MAKING CAR-WHEELS, &c.

1,005,230.      Specification of Letters Patent.      Patented Oct. 10, 1911.

Application filed January 30, 1911. Serial No. 605,545.

*To all whom it may concern:*

Be it known that I, SHERWOOD S. KNIGHT, a citizen of the United States, residing at Webster Groves, St. Louis county, Missouri, have invented a certain new and useful Improvement in Methods of Making Car-Wheels, &c., of which the following is a full, clear, and exact description, such as will enable others skilled in the art to which it appertains to make and use the same.

This invention relates to a method of making car wheels and other metal articles of approximately circular shape.

One object of my invention is to provide a method by which strong and light-weight car wheels having perfectly true, rolled threads can be manufactured at a low cost.

Another object is to provide a method of making car wheels and other metal articles of approximately circular shape which overcomes the necessity of placing a wheel in a lathe and turning the tread of the wheel. And still another object is to provide an inexpensive method of making car wheels and other articles of approximately circular shape which makes it possible to produce articles of perfectly uniform dimensions and contour and in which the metal is thoroughly consolidated.

Briefly described, my method consists in first casting a circular-shaped article to approximate shape from molten metal, thereafter subjecting it to pressure while it is in a heated state so as to thoroughly consolidate the metal and force any surplus metal in the body portion outwardly into the periphery and finally removing the surplus metal from the periphery and rolling the periphery while the article is still in a heated condition.

Any suitable apparatus may be used for practicing my method, and in order that my invention may be clearly understood I have herein illustrated a pressing and rolling apparatus that can be used in manufacturing car wheels in accordance with my method; said apparatus forms no part of my present invention, however, as my present invention relates to the method irrespective of the means or apparatus that is used for practicing it.

The figure of the drawings is a vertical sectional view of a pressing and rolling apparatus adapted to be used in the manufacture of cast metal car wheels.

Referring to the drawings, 1 and 2 designate the coöperating members of a two-part shaping die, the face $1^a$ of the member 1 conforming to the shape of one side of a car wheel and the face $2^a$ of the member 2 conforming to the shape of the other side of the wheel. The member 1 is carried by a shaft 3 that is rotatably mounted in a stationary bearing 4, and said shaft is provided with a gear 5 that coöperates with suitable driving means (not shown) for imparting rotary movement to said shaft and to the die member 1 thereon. The die member 2 is carried by a ram 6 which reciprocates in a cylinder 7 to which some suitable operating medium is supplied so as to force the die member 2 toward the die member 1. A ram 8 which is reciprocatingly mounted in the cylinder 9 in the shaft 3 is provided with a mandrel $8^a$ that centers the car wheel A being operated on, and said ram 8 is provided at its opposite end with a piston 10 that reciprocates in a cylinder 11, some suitable operating medium, such, for example, as a fluid or liquid under pressure being supplied to the cylinder 9 to move the mandrel $8^a$ into engagement with the car wheel and to the cylinder 11, to withdraw said mandrel from engagement with said wheel.

Pins 12 or some other suitable means are mounted on the die member 2 for ejecting the wheel from said die member after it has been pressed and rolled. The means for rolling the thread A' and also the flange $A^2$ of the wheel consists of a roller die 13 loosely mounted on a ram 14 which reciprocates in a cylinder 15, to which a suitable operating fluid or liquid under pressure is supplied, the face of said roller die 13 being tapered slightly so as to form the required bevel on the tread of the wheel.

As previously stated, the first step of my method consists in casting the wheel to approximate shape from molten metal. Any suitable mold or molding apparatus may be used for this purpose and I have therefore not illustrated same, but it is preferable to use a sand mold and to form the wheel from cast steel. Thereafter, the wheel is subjected to pressure while it is in a heated condition so as to consolidate the metal and impart the final shape to the wheel, it being preferable to place the wheel in a press of the type illustrated in the drawings after the wheel has been removed from the mold in which it is cast and while it is still hot. Pressure is admitted to the cylinder 9 so as to force the mandrel 8ª into the axle opening in the center of the wheel and thus center the wheel, and pressure is also admitted, preferably at the same time, to the cylinder 7. This causes the die members 1 and 2 to exert pressure on the opposite sides of the wheel and thus consolidate the metal in the wheel, the pressure being preferably from 1200 to 1500 pounds per square inch, so that any surplus metal in the body of the wheel will be forced outwardly into the tread and flange of the wheel. After the die members have been closed as above described, rotary movement is imparted to the shaft 3 so as to revolve the die members 1 and 2 and the wheel clamped between same. The ram 14 which carries the tapered face roller die 13 is then moved into operative position by admitting pressure to the cylinder 15, thereby causing the roller die 13 to move transversely across the tread of the wheel and shear off any excess metal on the tread and simultaneously roll the tread and flange of the wheel.

The roller die 13 is provided with a curved surface 13ª that coöperates with a similarly formed surface 1ᵇ on the die member 1 to compress the metal in the flange A² of the wheel and roll said flange, and as the face of said die 13 is tapered the metal in the tread of the wheel will be forced inwardly and also toward the side die member 1 when said roller die moves transversely across the wheel, thereby consolidating and rolling the metal in the tread and imparting the required bevel to the tread of the wheel.

After the wheel has been compressed and rolled sufficiently to thoroughly consolidate the metal in the wheel and roll the tread and flange of the wheel the various members or parts of the press are separated so as to permit the wheel to be removed while still at a high temperature and placed in a soaking pit to anneal, the pins 12 in the die member 2 operating to positively eject the wheel from said member when said pins strike against the housing in which the ram 6 is mounted.

I have not herein illustrated means for withdrawing the rams 6 and 14 from the position illustrated in the figure but it will, of course, be understood that in practice each of said rams is provided with a piston and a coöperating cylinder similar to the piston 10 and cylinder 11 shown in the drawings.

The method above described makes it possible to produce exceptionally strong and light-weight car wheels having perfectly true treads because the pressing action to which the wheel is subjected while it is in a heated state closes up any blow-holes or shrinks in the metal, welds the metal together, and forces any surplus metal in the body portion outwardly into the tread portion, the shearing action of the roller die 13 removes the surplus metal from the tread, and the rolling action to which the tread and flange of the wheel is subjected operates to thoroughly consolidate the metal in that portion of the wheel which is subjected to the greatest wear. Furthermore, such a method makes it possible to produce the entire wheel from very high-grade material so that the wheel is strong enough to successfully withstand shocks and shearing strains. It has practically the same life as a wheel provided with a removable or shrunk-on tread, and after the tread has become worn the wheel can be put in a lathe and the tread re-turned.

The method is quick and inexpensive, and while I have described it as being used in the manufacture of a cast car wheel provided with a rolled tread and flange it could, of course, be used in the manufacture of various other circular-shaped articles.

Having thus described the invention, what is claimed as new and desired to be secured by Letters Patent is:

1. A method of producing a cast metal article of approximately circular shape which consists in first casting the article to approximate shape from molten metal and thereafter subjecting it to pressure so as to thoroughly consolidate the metal therein and force any surplus metal in the body part outwardly into the peripheral portion of the article, and finally shearing off the surplus metal and rolling the periphery of the article.

2. A method of producing a circular-shaped cast metal article which consists in first casting the article to approximate shape, then placing the article in a die while it is in a heated condition and subjecting it to great pressure so as to impart the final shape to the article and consolidate the metal and force any surplus metal outwardly into the peripheral portion of the article, and thereafter moving a cutting tool transversely across the periphery of the article while it is still clamped in said die so as to remove any surplus metal and make the periphery of the article perfectly true.

3. A method of making a cast metal car wheel characterized by pressing the body portion of the wheel so as to force any surplus metal outwardly into the tread portion, and simultaneously removing said surplus metal and rolling the tread of the wheel while it is still in a heated condition after it has been removed from the mold in which it is cast.

4. A method of making a car wheel characterized by subjecting the body portion of a cast metal wheel to pressure while it is in a heated state so as to consolidate the metal therein and force any surplus metal outwardly into the tread portion of the wheel, and thereafter subjecting the tread portion of the wheel to a shearing and rolling action while it is still hot so as to remove any surplus metal and form a perfectly true, rolled tread.

5. A method of making a car wheel which consists in first casting the wheel to approximate shape from molten metal, then subjecting the wheel to pressure while it is in a heated state to close up any shrinks or blow holes and force any surplus metal in the body portion into the tread, thereafter removing the surplus metal and rolling the tread and flange of the wheel, and finally annealing the wheel.

6. A method of making a car wheel characterized by exerting pressure on the opposite sides of a cast metal car wheel while it is in a heated condition, so as to thoroughly consolidate the metal and force any surplus metal in the body of the wheel outwardly into the tread of the wheel, and removing surplus metal from the tread and rolling the tread and flange.

7. A method of making a cast metal car wheel which consists first in casting the wheel to approximate shape, then compressing it in a die while it is in a heated condition so as to thoroughly consolidate the metal in the wheel, and shearing off the surplus metal in the tread of the wheel and rolling said tread.

8. A method of making a cast metal car wheel which consists first in casting the wheel to approximate shape, then compressing it in a die while it is in a heated condition so as to thoroughly consolidate the metal in the wheel, and thereafter revolving the wheel and moving a roller die into engagement with the wheel and transversely across the tread of same.

In testimony whereof I hereunto affix my signature in the presence of two witnesses, this twenty-seventh day of January, 1911.

SHERWOOD S. KNIGHT.

Witnesses:
WELLS L. CHURCH.
GEORGE BAKEWELL.

---

Copies of this patent may be obtained for five cents each, by addressing the "Commissioner of Patents, Washington, D. C."

It is hereby certified that in Letters Patent No. 1,005,230, granted October 10, 1911, upon the application of Sherwood S. Knight, of Webster Groves, Missouri, for an improvement in "Methods of Making Car-Wheels, &c.," errors appear in the printed specification requiring correction as follows: Page 1, line 17, for the word "threads" read *treads*, and same page, line 89, for the word "thread" read *tread;* and that the said Letters Patent should be read with these corrections therein that the same may conform to the record of the case in the Patent Office.

Signed and sealed this 26th day of March, A. D., 1912.

[SEAL.]

C. C. BILLINGS,
*Acting Commissioner of Patents.*